July 25, 1967  H. C. FLINT  3,332,719
SPRING SEAT

Filed April 26, 1965  3 Sheets-Sheet 1

INVENTOR.
Hyland C. Flint
BY
Barnard, McGlynn & Reising
ATTORNEYS

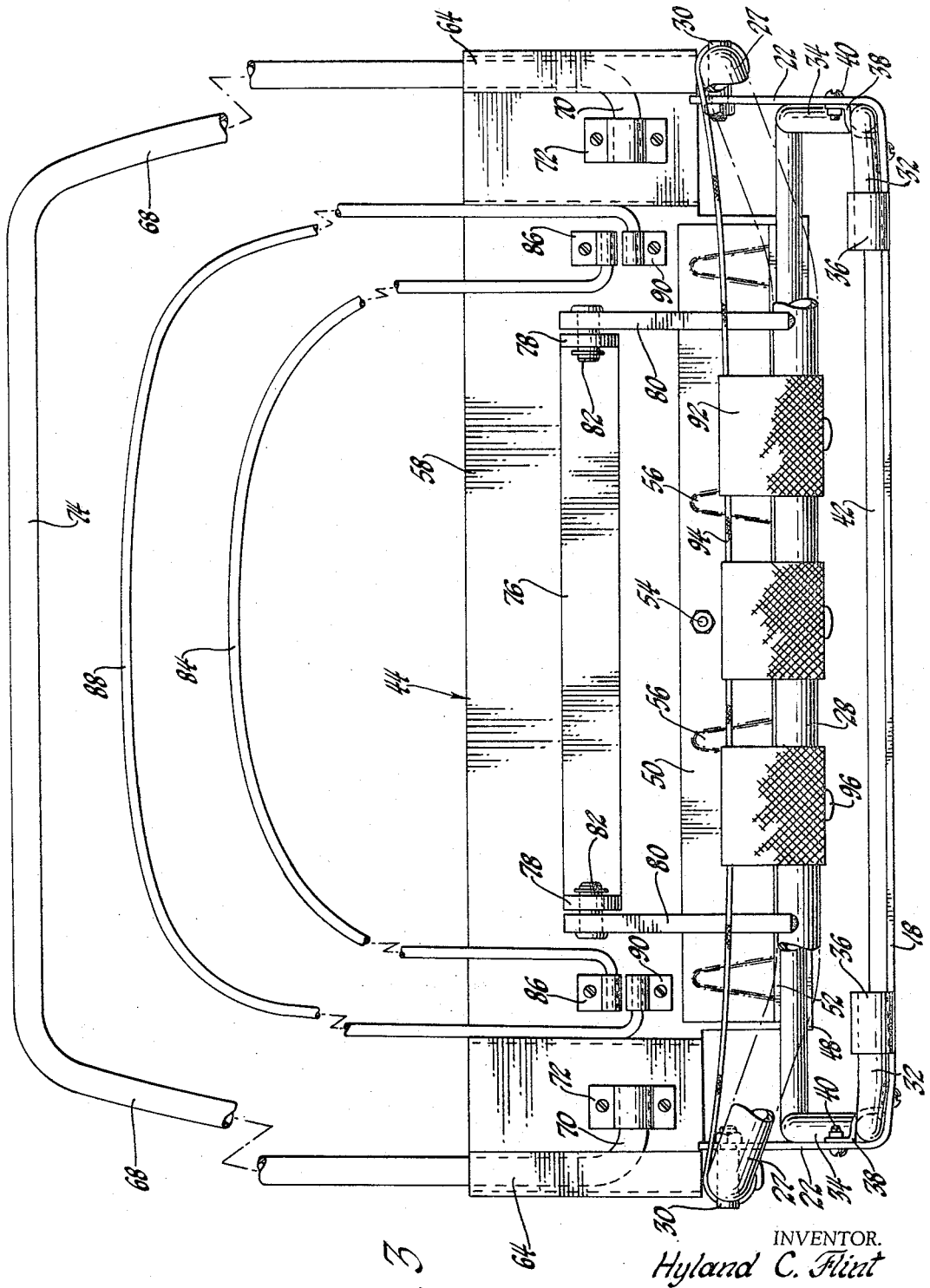

July 25, 1967   H. C. FLINT   3,332,719
SPRING SEAT
Filed April 26, 1965   3 Sheets-Sheet 3
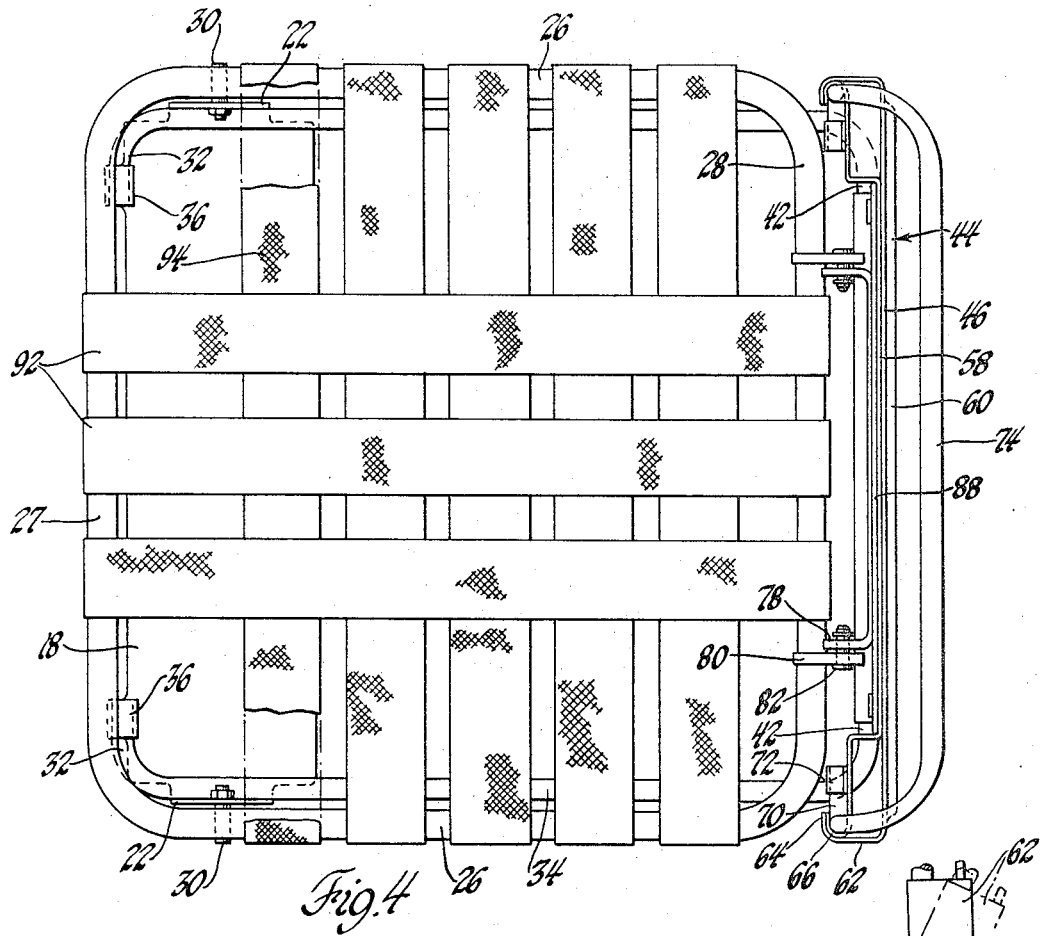
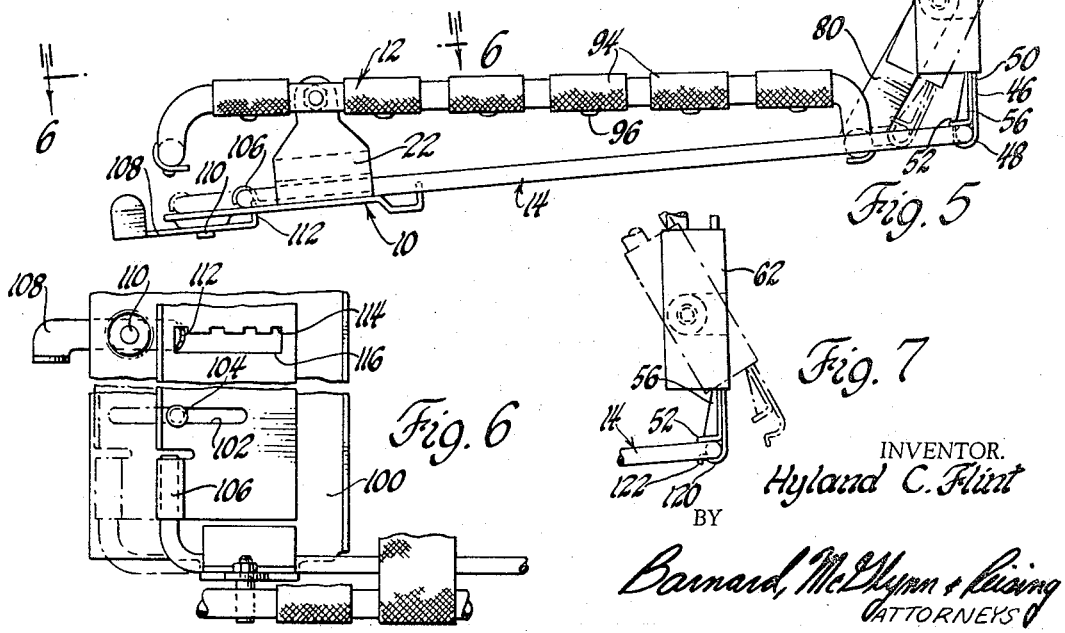
INVENTOR.
Hyland C. Flint
BY
Barnard, McElhynn & Reising
ATTORNEYS

United States Patent Office 3,332,719
Patented July 25, 1967

3,332,719
SPRING SEAT
Hyland C. Flint, 3551 Walnut Lake Road, Rte. 2,
Orchard Lake, Mich. 48033
Filed Apr. 26, 1965, Ser. No. 450,887
23 Claims. (Cl. 297—309)

This invention relates to seats, and more particularly to a unison action seat of extremely simple supporting structure and extremely thin contour.

The usual seat structure, in either a vehicle seat or as a piece of furniture, is a complicated and bulky affair with rigid border frames for supporting the usual springs and cushions in both the seat and back support structures. It is highly desirable, particularly in vehicle seating, to provide seat structures that are of suitable strength and resilience to support a seated person and provide a comfortable seating condition. In the past, it has been the practice to provide a rigid and strong basic structure on which is disposed a complicated and cumbersome seat cushion and backrest cushion, including border frames and the like, numerous springs, and being of extreme depth to provide the desired resilience and comfort. Such structures are obviously expensive. Furthermore, such structures take up a considerable amount of space, and in vehicles where available space is limited, roominess must be sacrificed for comfort in the seat structure.

Most presently available seating structures do not provide the maximum in comfort for the user. The use of the unison action seating concept in seat structures, and particularly in automotive seating, has been limited because of the space requirements and bulkiness of the type of seating structure heretofore employed. The unison action seating concept is one in which the back support is attached to the seat or seat frame in such manner as to move with the portion of the seat that deflects due to the weight of the user, and wherein the back support in its movement maintains, or substantially maintains, its angular relationship relative to the base frame or the ground rather than maintaining its angularity relative to the seat support. The use of such a concept in automotive or furniture seating is extremely desirable and provides maximum comfort for the user.

The device in which this invention is embodied comprises, generally, a unison action seat structure formed of relatively simple frame elements, having in themselves a degree of resilience, and so disposed as to provide much of the spring support required for the seat structure. A seat frame is pivotally supported on a base near the forward end of the seat frame for deflection of the rear of the frame when the seat is occupied. A U-shaped spring support wire extends generally parallel to the seat frame and below the seat frame, the spring support being secured to the base frame near its forward end and the spring extending rearwardly beneath the seat frame. Pivotally secured to the seat frame and to the support spring is a back frame structure of extreme simplicity, that includes a U-shaped border wire and one or more resilient spring wires extending into the space enclosed by the U-shaped border wire. Any number of such spring wires may be employed in the back frame, so spaced within the border wire to provide high selectivity in the backrest support and at the same time maintain an extremely thin outline for the back support frame.

A seat structure so constructed is extremely simple to manufacture and produce and is much less expensive than the presently available seating structures, due to the few number of parts and the simple and uncomplicated manufacture and assembly procedure. The size or thickness of the back and seat support frames is extremely small, permitting great adaptability of the seat structure to either automotive or furniture use without concern for extensive size, weight or cost restrictions. A seating structure utilizing the invention may be so constructed as to permit tilting of the back frame forwardly over the seat support structure, as is often desirable in automotive seating, and at the same time, the structure may be manufactured so as to permit the back frame to recline relative to the seat frame for added comfort of the user. The overall result is an extremely efficient seating structure, readily adaptable to numerous environments, and a structure which is inexpensive to manufacture and assemble.

These and other advantages will become more apparent from the following description and drawings in which:

FIGURE 3 is a front elevational view of the structure illustrated in FIGURES 1 and 2 with parts broken away and in section to illustrate the position of the various parts;

FIGURE 4 is a plan view of the seating structure illustrated in FIGURES 1 through 3;

FIGURE 5 is a side elevational view of a modified form of the structure illustrated in FIGURES 1 through 4;

FIGURE 6 is a plan view of a portion of the modified form of seating structure illustrated in FIGURE 5; and FIGURE 7 is a side elevational view of a portion of the structures illustrated in FIGURES 1 through 6, showing a further modification thereof.

Figure 1:
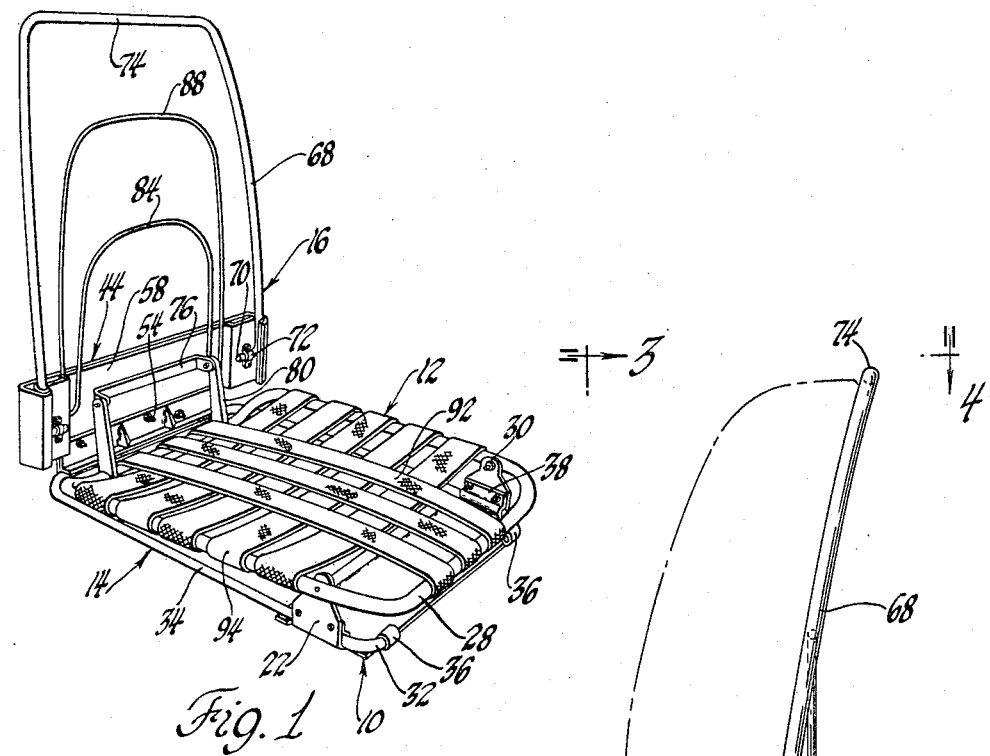
FIGURE 1 is a perspective view of a seat support structure and back frame embodying the invention.

Referring more particularly to FIGURE 1, the general arrangement of the seating structure is shown to include a base member, illustrated generally by the numeral 10, extending laterally across and below the overall structure. Base member 10 may be secured in any suitable manner to the structure supporting the chair as, for example, the floor of a vehicle body if the seating structure is to be used in an automobile. Secured to the base member 10 in a manner to become hereinafter more particularly described, is a seat frame, illustrated generally by the numeral 12, which extends rearwardly from the base member 10 and includes suitable means to support a cushion or the like. Also secured to the base member 10 is a U-shaped spring support wire, illustrated generally by the numeral 14, which extends in generally parallel spaced relation to the seat frame 12 and below the seat frame. Mounted at the rear of the seat frame 12 is a back frame, illustrated generally by the numeral 16, and which will be hereinafter more particularly described. The frame 16 is pivotally mounted to the seat frame 12 as well as pivotally mounted to the rear cross member of the spring support wire 14.

Figure 2:
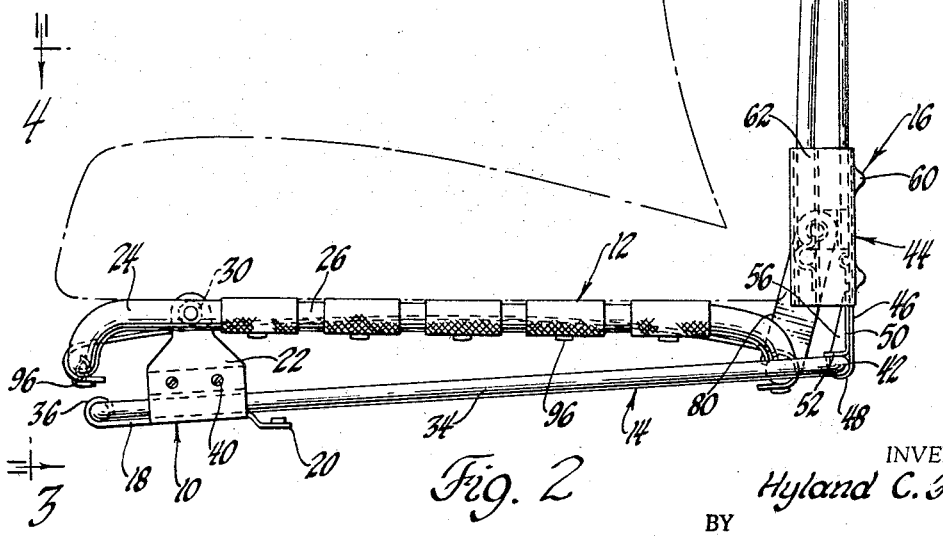
FIGURE 2 is an elevational view of the seat structure illustrated in FIGURE 1.

Referring now to FIGURES 2 through 4, the base member 10 includes a generally flat plate 18, having a rearward flange 20 permitting securement to the supporting body. Extending upwardly from each end of the plate 18 is a tab, or flange, 22 to provide securement means for the seat frame 12 and the spring support wire 14.

Seat frame 12 may be formed of a tubular member 24, extending in generally rectangular fashion and having side portions 26, a front portion 27 and a rear portion 28. The particular shape of the side and rear portions 26, 27 and 28 is not important, although these are illustrated in the figures as being formed so that the front and rear portions 27 and 28 drop below the side portions 26 to give the effect of a bucket-type seat. Side portions 26 of the seat frame 12 are pivotally secured adjacent their forward ends to the flanges 22, extending upwardly from the base member 10. Suitable pivot means, such as the nut and bolt assemblies 30, may be employed, the nut and bolt assemblies extending through the flanges 22 and the side members 26. With such pivotal mounting, the rearward portion of the seat frame 12 is permitted to move upwardly and downwardly about the pivot connections 30.

The seat support spring wire 14 is shown to be a generally U-shaped member, having inwardly turned ends 32 on the legs 34. Ends 32 are received in suitably rolled portions 36 formed from the base member 10 and are held in place by such rolled portions 36. Securing plates 38 are secured to the inner surfaces of the side flanges 22 and to the plate portion 18 of the base member 10 by means of suitable nut and bolt assemblies 40, or in any other suitable manner, such members 38 clamping the legs 34 of the spring member to the base member 10. The legs 34 of the spring member 14 extend rearwardly beneath the seat frame 12, and the cross member 42 is disposed below the seating surface of the seat frame 12 and rearwardly thereof.

Extending across the back of the seat structure is a lateral member, illustrated generally by the numeral 44, forming the base for the back frame 16. Lateral member 44 includes an outer plate 46 terminating along its lower edge in a channel 48. The channel 48 receives the rear cross member 42 of the spring support wire 14. An inner plate 50, having a forwardly directed flange 52, is secured to the outer plate 46 in any suitable manner, as by nut and bolt assemblies 54, the flange 52 closing the channel 48 to maintain the cross member 42 of the spring support wire 14 therein. The inner plate 50 may be provided with triangular depressions 56 to serve as strengthening ribs, should such depressions be desirable. Thus, the lateral member 44 is pivotally secured by the channel arrangement 48–52 to the cross member 42 of the spring support wire 14.

Secured along the inner surface of the outer plate 46 is a second inner plate 58, formed at its ends to provide a box section with the outer plate 46 for strengthening purposes. The outer plate 46 may be additionally provided with lateral strengthening ribs 60, extending along the outer surface thereof, should such additional strength be necessary.

The ends of the outer plate 46 are formed forwardly, as at 62, and then inwardly, as at 64, and the extreme ends of the second inner plate 58 are reversely bent as at 66 to provide means for receiving the legs 68 of a U-shaped resilient wire, forming a border frame for the back frame structure 16. The extreme ends of legs 68 are bent inwardly as at 70, and are secured to the inner plate member 58 by means of U-shaped clips 72. The U-shaped border wire has a cross member 74, extending above and rearwardly of the seating structure in the manner shown.

Secured to the inner surface of the lateral member 44 is a bracket member 76, having forwardly directed end arms 78. Extending downwardly and forwardly from the arms 78 are a pair of spaced link members 80 which are in turn welded or otherwise secured to the rear member 28 of the seat frame 12. Suitable pivot means 82 connect the links 80 and the arms 78 to permit pivotal movement of the back frame 16 relative to the seat frame 12.

In order to provide backrest support and resilience within the space enclosed by the border wire 68–70 of the back frame 16, a U-shaped spring wire 84 extends upwardly from the lateral member 44 between the legs 68 of the border wire. The extreme ends of the spring wire 84 are bent either inwardly or outwardly for securement to the lateral member 44 by means of sheet metal clips 86. Clips 86 are secured to the inner and/or outer plates 58 and 46 in any suitable manner. Should more support in the back frame 16 be required, additional U-shaped spring wires, such as wire 88, may also be disposed within the area enclosed by the border wire and secured to the lateral member 44, as by clips 90. The U-shaped spring wires 84 and 88 are of lighter gauge spring wire than the outer border frame 68–74 and lie in substantially the same plane within the space enclosed by the border wire. These spring wires 84 and 88 are so arranged to have the crossed portions thereof in spaced vertical array, and it is apparent that the spring support provided by each of these wires will vary in accordance with the length of the legs thereof. The lowest cross member, such as the cross member of spring 84, would be preferably located in the area to support the small of the back of a seated person, and additional cross members would be located to provide high selective feel for a backrest structure in accordance with their location. It will also be apparent that by varying the selection of wire gauges, by varying the length of the legs of the members, and by location of the cross members between the cross member 74 of the border wire and the lateral member 44, proper resilient support can be provided all along the back frame, still maintaining a thin outline of the back frame 16 as viewed from the side.

The upholstery or seating cushion for the seat frame may be supported on the tubular member 24 by means of a series of longitudinal strips 92 extending between the end portions 28, and a series of lateral strips 94, extending between the side portions 26. Such strips 92 and 94 may be secured to the tubular seat frame 24 by means of suitable fastening devices 96, passing through a turned-under end of the strip and through one wall of the tubular frame 24. Any other suitable fastening means may be provided. Strips 92 and 94 may be made of any suitable material, although it has been found that a satisfactory material is a commercially available webbing formed of two layers of rubber with a cotton duck material, bias cut, disposed between the two layers and the entire sandwich vulcanized. Such material is readily available and is manufactured by the Firestone Tire and Rubber Company under the trade name Diatex. Such webbing may form a base for an upholstery cushion of foam rubber or any other suitable material, or a separate cushion containing coil springs or the like.

To provide padding for the back frame 16, and since the spring wires 84 and 88 provide a great amount of resilience, the thin contour of the back frame 16 may be maintained by utilizing a mitten of suitable material that may have a foam rubber cushion secured thereto or enclosed therein in some suitable manner.

Reference is now made to FIGURES 5 and 6, illustrating a modified form of the seat structure hereinbefore described, which permits the back frame 16 to recline relative to the seat frame 12. Like reference numerals indicate like parts, and it may be seen from FIGURES 5 and 6 that the seat frame 12 is pivotally mounted on the flange 22 formed upwardly from the mounting plate, illustrated generally by the numeral 10. In this instance, however, the spring wire 14 is secured to a separate plate 100, extending across the base frame 10 and having slots 102 formed at spaced points therealong. Extending through the slots 102 and into the base frame 10 are pins 104, restricting the movement of the plate 100 to a longitudinal direction. The inwardly turned ends of the spring 14 are secured in rolled portions 106 formed integrally from the plate 100. Pivotally secured in the base member 10 is a lever 108, mounted by means of a suitable fastening device 110. The rearward end of lever 108 includes an upstanding tab 112, receivable in notches 114 formed in the plate 100. Connecting the notches 114 is a slot 116, the slot and notches being so arranged that when the tab 112 is disengaged from a notch 114 and into the slot 116, the entire plate 100, along with the wire support spring 14, may be moved forwardly or rearwardly. The tab 112 may be returned to another of the notches 114 when the desired reclined position is reached. It will be apparent that by moving the plate 100 and the forward ends of the support spring 14 forward or rearwardly, the channel portion 48–52, pivotally securing the back frame 16 to the support spring 14, will be moved forwardly thus causing the back frame 16 to tilt or recline about the pivot pins 82. This permits changes in angularity of the back frame 16 relative to the seat frame 12 at the desire of the occupant of the seat structure.

With such reclining movement, it will be apparent that the free length of the seat support wire 14 will change along with movement of the back frame into a reclining position. In other words, as the back frame reclines, the free length of the legs of the support wire 14 will decrease, thus increasing its spring rate to become stiffer. By becomming stiffer, the spring compensates for the increased vertical load on the back frame 16 caused by the rearward movement of the center of gravity of the occupant of the seat.

Reference is now made to FIGURE 7, illustrating another modification of the seat support mechanism which will permit the back frame 16 to tilt forwardly over the seat frame 12, such as is common in the front seats of automobiles. In the modification illustrated in FIGURE 7, the channel portion 120 formed along the lower edge of the lateral member 44 terminates in a reversely bent flange 122, extending only partially around the rear member 42 of the seat support wire 14. By applying a force to the back frame 16 in a forward direction, the forward edge of channel 120 may be sprung out of engagement with the rear cross member 42 and the channel entirely disengaged. The back frame 16 may then pivot about the pivot pins 82 to a position over the seat frame. To return the back frame 16 to its seating position, the back frame is forced rearwardly so that the reversely bent portion 122 of the flange 120 properly engages the rear cross member 42 and snaps over the cross member to lock the structure in place. The normal seating of an individual on the seat structure provides a force against the back frame 16 to tend to maintain the channel 120 in its proper engagement with the seat support wire 14. The structure that permits tilting of the back frame 16 is applicable to the modification of the seat structure illustrated in FIGURES 1 through 4, as well as to the modification illustrated in FIGURES 5 and 6.

It will now become apparent that when an occupant sits in the seat structure, the seating frame will pivot downwardly about its pivot points 30. As this happens, the links 80, acting through the pivots 82 and the bracket 76, pull the back frame 16 downwardly along with the deflection of the seat frame 12. At the same time, the U-shaped supporting spring 14 deflects, since it is connected to the transverse member 44 of the back frame 16. Such movement of the seat support spring 14 occurs about a point adjacent the rearward engagement of the spring 14 with the base frame 10, causing the rear cross member 42 of the spring 14 to travel in a very shallow arc. The back frame 16, pivoting about the pivots 82 and the back member 42 of the spring 14, maintains substantially vertical movement in its downward or upward deflection. This provides the desired unison action movement of the back frame 16 along with deflection or movement of the seat frame 12.

Thus, a seat structure is provided which is extremely simple to manufacture and assemble, and which provides a very thin contour or shape to the overall seat construction. A back frame is provided which has inherent resilience, not only in its border frame structure, but also with the U-shaped spring members extending into the area enclosed by the border wire. This permits a great reduction in the normal upholstery utilized in seating structures, a great saving in cost, as well as savings in bulk and weight otherwise attached to seating units. The seating structure provided permits both reclinability and tilting of the back frame relative to the seat support frame, readily adapting the seating structure to many different environments.

Numerous changes and modifications in the structure will now become apparent to those having skill in the art, after having had reference to the foregoing description and drawings. However, it is not intended to limit the scope of the invention by the foregoing description and drawings, but by the scope of the appended claims.

The embodiments of the invention in which an exclusive property or privilege is claimed are defined as follows:

1. A back frame for a unison action seat structure having a base member and a seat frame pivotally secured to the base member and a support member secured to the base member and extending rearwardly beneath the seat frame, said back frame comprising:
   a lateral member extending across said seat frame;
   means for pivotally securing said lateral member to the rear of said seat frame;
   means for pivotally securing said lateral member to the rear of said support member beneath said seat frame;
   a U-shaped border member secured to said lateral member and extending upwardly therefrom;
   and a U-shaped spring member secured to said lateral member and extending upwardly therefrom into the space enclosed by said border member to provide resilient support within the space enclosed by said border member.

2. The back frame set forth in claim 1 and further including a second U-shaped spring member secured to said lateral member and extending upwardly therefrom and between said first-mentioned U-shaped spring member and said border member.

3. The back frame set forth in claim 1 wherein said means for pivotally securing said lateral member to said seat frame includes a bracket secured to said lateral member and having forwardly extending arms, link members rigidly secured to said seat frame and extending toward said arms, and pivot pins connecting said arms and said link members for relative pivotal movement.

4. The back frame set forth in claim 1 and further including means formed thereon for permitting disengagement of said lateral member from said support member to allow said back frame to tilt relative to said seat frame about the pivotal connection between said back frame and said seat frame.

5. The back frame set forth in claim 1 wherein said means for pivotally securing said lateral member to said support member includes a channel portion extending along the edge of said lateral member and receiving said support member, and a plate having a forwardly directed flange secured to said lateral member, said flange overlying said support member and said channel.

6. The back frame set forth in claim 5 wherein said channel is resilient to permit said lateral member to disengage from said support member and allow said back frame to be tilted forwardly relative to said seat frame and about the pivot connection between said back frame and said seat frame.

7. A back frame for a unison action seat structure having a base member and a seat frame pivotally secured to said base member and a supporting member secured to said base member and extending rearwardly beneath said seat frame, said back frame comprising:
   a lateral member extending across the rear of said seat frame and having a forwardly directed flange along the lower edge thereof;
   a bracket secured to said lateral member and having forwardly directed arms extending therefrom;
   link members pivotally secured to said arms at one end and rigidly secured to said seat frame at the other ends, said link members and said bracket permitting pivotal movement of said back frame relative to said seat frame;
   a plate extending across said lateral member and having a forwardly directed flange disposed in spaced relation to said flange on the lower edge of said lateral member, said spaced flanges providing a channel for receiving the rearward portion of said supporting member and permitting relative pivotal movement of said back frame relative to said supporting member;
   a U-shaped border member secured to said lateral member and extending upwardly therefrom;

and a U-shaped spring member secured to said lateral member and extending upwardly therefrom and into the space enclosed by said border member to provide resilient support within said border member.

8. A back frame for a unison action seat structure having a base member and a seat frame pivotally secured to said base member and a supporting member secured to said base member and extending rearwardly beneath said seat frame, said back frame comprising:

a lateral member extending across the rear of said seat frame and having a forwardly directed channel along the lower edge thereof for receiving the rearward portion of said supporting member and permitting relative pivotal movement of said back frame relative to said supporting member;

a bracket secured to said lateral member and having forwardly directed arms extending therefrom;

link members pivotally secured to said arms at one end and rigidly secured to said seat frame at the other ends, said link members and said bracket permitting pivotal movement of said back frame relative to said seat frame;

a U-shaped border member secured to said lateral member and extending upwardly therefrom;

and a U-shaped spring member secured to said lateral member and extending upwardly therefrom and into the space enclosed by said border member to provide resilient support within said border member.

9. A back frame for a unison action seat structure having a base member and a seat frame pivotally secured to said base member and a supporting member secured to said base member and extending rearwardly beneath said seat frame, said back frame comprising:

a lateral member extending across the rear of said seat frame and having a forwardly directed channel along the lower edge thereof, said channel receiving the rearward portion of said supporting member and permitting relative pivotal movement of said back frame relative to said supporting member, a portion of said channel being resilient to permit disengagement of said lateral member from said supporting member and allow said back frame to tilt forwardly relative to said seat frame about said pivotal connection between said link members and said bracket;

a bracket secured to said lateral member and having forwardly directed arms extending therefrom;

link members pivotally secured to said arms at one end and rigidly secured to said seat frame at the other ends, said link members and said bracket permitting pivotal movement of said back frame relative to said seat frame;

a U-shaped border member secured to said lateral member and extending upwardly therefrom;

and a U-shaped spring member secured to said lateral member and extending upwardly therefrom and into the space enclosed by said border member to provide resilient support within said border member.

10. A back frame for a unison action seat structure having a base member and a seat frame pivotally secured to said base member and a supporting member secured to said base member and extending rearwardly beneath said seat frame, said back frame comprising:

a lateral member extending across the rear of said seat frame and having a forwardly directed flange along the lower edge thereof;

a bracket secured to said lateral member and having forwardly directed arms extending therefrom;

link members pivotally secured to said arms at one end and rigidly secured to said seat frame at the other ends, said link members and said bracket permitting pivotal movement of said frame relative to said seat frame;

a plate extending across said lateral member and having a forwardly directed flange disposed in spaced relation to said flange on the lower edge of said lateral member, said spaced flanges providing a channel for receiving the rearward portion of said supporting member and permitting relative pivotal movement of said back frame relative to said supporting member, said flange on said lateral member being resilient to permit disengagement of said lateral member from said supporting member and allow said back frame to tilt forwardly relative to said seat frame about said pivotal connection between said link members and said bracket;

a U-shaped border member secured to said lateral member and extending upwardly therefrom;

and a U-shaped spring member secured to said lateral member and extending upwardly therefrom and into the space enclosed by said border member to provide resilient support within said border member.

11. A unison action seat comprising:
a base member;
a seat frame pivotally secured at the forward end thereof to said base member;
a supporting spring member secured at the forward end thereof to said base member;
and a back frame pivotally secured to the rearward end of said seat frame and pivotally secured to the rearward end of said spring member to permit movement of said back frame with deflection of said seat frame so that the angularity of said back frame relative to said seat frame is substantially constant, said back frame having a U-shaped border member extending upwardly from said seat frame and a plurality of U-shaped spring members disposed within the space enclosed by said border member and having cross portions in spaced relation between the cross portion of said border member and said seat frame.

12. The unison action seat set forth in claim 11 and further including movable means securing said supporting spring member to said base member for permitting said back frame to change angularity relative to said seat frame.

13. The unison action seat set forth in claim 12 wherein said movable means includes a plate extending across said base member and having spaced slots formed therein, fastening means secured in said base member and received in said slots, and means for securing said spring supporting member to said plate, said plate and said supporting member being movable forwardly and rearwardly relative to said base member.

14. The unison action seat set forth in claim 13 and further including latch means operatively connecting said base member and said plate for locking said plate member in any of a plurality of positions relative to said base member.

15. A unison action seat comprising:
a base member;
a seat frame pivotally secured to said base member;
a supporting spring member secured to said base member and extending therefrom in generally spaced parallel relation to said seat frame;
and a back frame pivotally secured to said seat frame and pivotally secured to said spring member for movement with said seat frame without substantial change in angularity relative to said base member, said back frame having a lateral member and a U-shaped border member extending upwardly from said lateral member and a U-shaped spring member extending upwardly from said lateral member, the cross portion of said U-shaped spring member being spaced between said lateral member and the cross portion of said border member to provide resilient support for a load against said back frame.

16. The unison action seat set forth in claim 15 and further including means permitting said back frame to change angularity relative to said seat frame and to increase resistance of said supporting spring as the degree of angularity of said back frame increases relative to said seat frame.

17. The unison action seat set forth in claim 15 and further including movable means securing said supporting spring member to said base member for permitting said back frame to change angularity relative to said seat frame.

18. The unison action seat set forth in claim 17 wherein said movable means includes a plate extending across said base member and having spaced slots formed therein, fastening means secured in said base member and received in said slots, and means for securing said spring supporting member to said plate, said plate and said supporting member being movable forwardly and rearwardly relative to said base member.

19. The unison action seat set forth in claim 18 and further including latch means operatively connecting said base member and said plate for locking said plate member in any of a plurality of positions relative to said base member.

20. A unison action seat comprising:
a base member;
a seat frame pivotally secured to said base member;
a supporting spring member secured to said base member and extending therefrom in generally spaced parallel relation to said seat frame;
and a back frame pivotally secured to said seat frame and pivotally secured to said spring member for movement with said seat frame without substantial change in angularity relative to said base member, said back frame having a lateral member and a U-shaped border member extending upwardly from said lateral member and a plurality of U-shaped spring members extending upwardly from said lateral member, the cross portions of said U-shaped spring members being spaced between said lateral member and the cross portion of said border member to provide resilient support for a load against said back frame.

21. The unison action seat set forth in claim 19 and further including movable means securing said supporting spring member to said base member for permitting said back frame to change angularity relative to said seat frame.

22. The unison action seat set forth in claim 21 wherein said movable means includes a plate extending across said base member and having spaced slots formed therein, fastening means secured in said base member and received in said slots, and means for securing said spring supporting member to said plate, said plate and said supporting member being movable forwardly and rearwardly relative to said base member.

23. The unison action seat set forth in claim 22 and further including latch means operatively connecting said base member and said plate for locking said plate member in any of a plurality of positions relative to said base member.

References Cited
UNITED STATES PATENTS

| | | | |
|---|---|---|---|
| 1,767,757 | 6/1930 | Harris | 297—309 X |
| 2,165,306 | 7/1939 | Shanahan | 297—300 |
| 2,177,363 | 10/1939 | Flint | 297—309 X |
| 2,346,414 | 4/1944 | Carpenter | 297—309 |
| 3,059,967 | 10/1962 | Flint | 297—309 |
| 3,071,413 | 1/1963 | Flint et al. | 297—309 |
| 3,261,642 | 7/1966 | Flint | 297—309 |

DAVID J. WILLIAMOWSKY, *Primary Examiner.*

G. O. FINCH, *Assistant Examiner.*